United States Patent Office 3,472,429
Patented Oct. 14, 1969

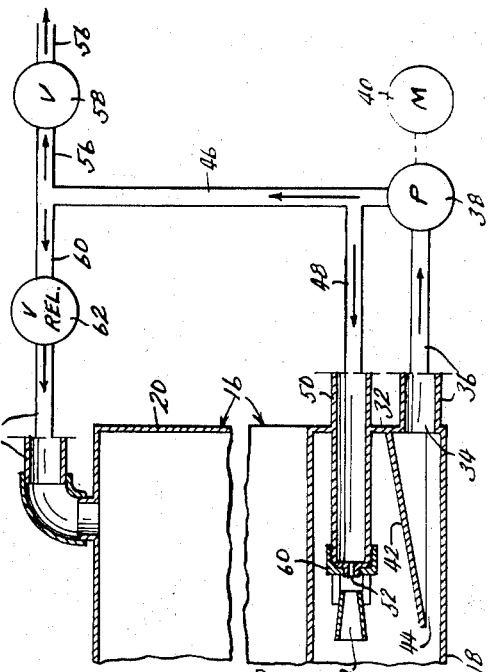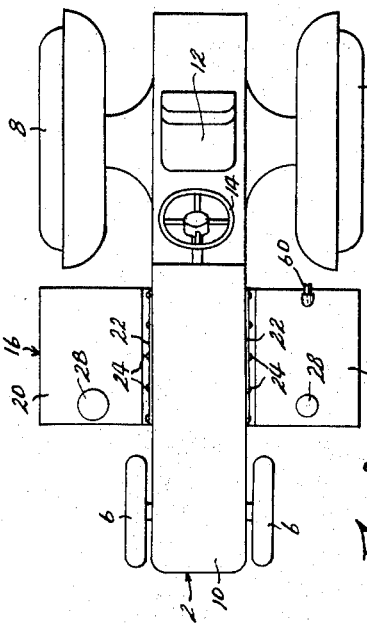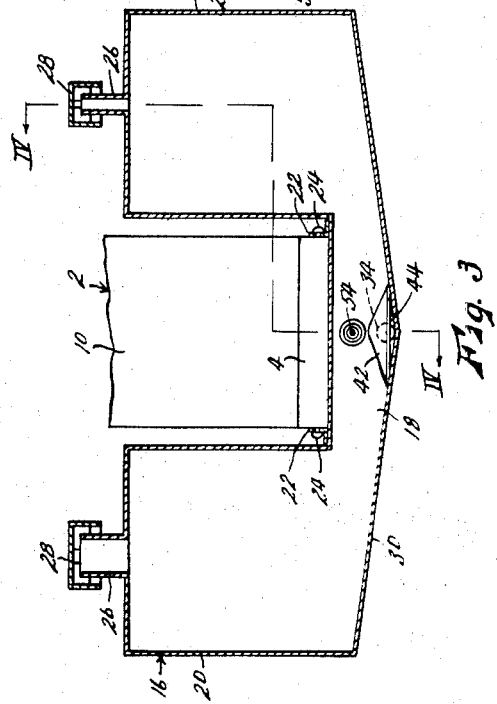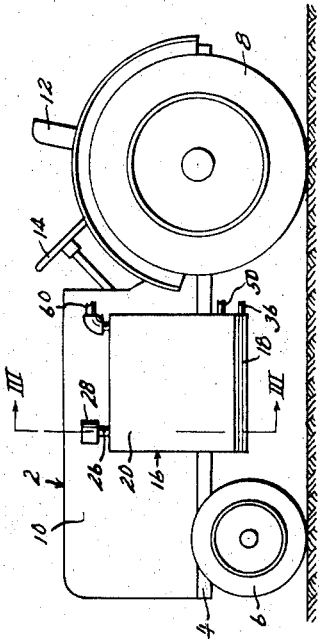

3,472,429
FERTILIZER TANK FOR TRACTORS
John L. Flentie, 315 Grant St.,
Sabetha, Kans. 66534
Filed Jan. 4, 1968, Ser. No. 695,689
Int. Cl. B67d 5/00
U.S. Cl. 222—178      2 Claims

ABSTRACT OF THE DISCLOSURE

A fertilizer tank for tractors, said tank being of generally U-shaped configuration whereby to extend transversely beneath the frame of the tractor and upwardly at each side of said frame, intermediate the front and rear tractor wheels, and means operable by a single power unit both to agitate liquid fertilizer in the tank continuously, and to deliver fertilizer from the tank to its point of use as required.

---

This invention relates to new and useful improvements in fertilizer apparatus for mounting on farm tractors, and relates more particularly to the storage and handling of the liquid fertilizer on the tractor prior to actual dispensing and application thereof to the ground.

One problem in connection with storage and handling has been the provision of sufficient capacity for efficient operation. Often, an ordinary fifty gallon oil drum is used for storage, and this in practice must be mounted at one side of the engine compartment of the tractor, forwardly of the operator, since the space immediately behind the tractor is occupied by the fertilizer applicator spray bars or other fertilizer applicator apparatus mounted on or towed behind the tractor. Said drums are of such height that they seriously obstruct the operator's vision when so mounted. Lower tanks would of course have a reduced capacity. Mounting two lower tanks respectively at opposite sides of the tractor would provide a satisfactory capacity, and would not unduly obstruct the operator's vision, but would complicate the valving arrangement necessary to switch from one tank to the other when the first tank is exhausted, and would also necessitate duplication of the agitator means required for some fertilizers having solid matter partially suspended in liquid, but which will settle out from the liquid if left undisturbed in the tank for any substantial time period.

Accordingly, the principal object of the present invention is the provision of a fertilizer tank and handling means which largely overcomes all of the above enumerated shortcomings of prior structures, in that it provides the high-capacity, low contour configuration required, within the space practically available therefor, including tank elements on both sides of the tractor, but which tank elements may nevertheless be serviced by a single delivery pump and agitating means. To this end, the invention incorporates a single U-shaped tank having a horizontal base portion adapted to extend transversely beneath the tractor frame intermediate the front and rear tractor wheels, and leg portions rising from each end of said base portion respectively at opposite sides of the tractor engine compartment.

Other objects are simplicity and economy of construction, efficiency and dependability of operation, and adaptability for use with many types and styles of tractors.

With these objects in view, as well as other objects which will appear in the course of the specification, reference will be had to the accompanying drawing, wherein:

FIG. 1 is a side elevational view of a farm tractor having a fertilizer tank embodying the present invention mounted operatively thereon, with parts omitted, FIG. 2 is a top plan view of the structure as shown in FIG. 1, FIG. 3 is an enlarged fragmentary sectional view taken on line III—III of FIG. 1, and FIG. 4 is an enlarged fragmentary sectional view taken on line IV—IV of FIG. 3, partially broken away and foreshortened, and showing the related pumping and agitation elements schematically.

Like reference numerals apply to similar parts throughout the several views, and the numeral 2 applies generally to an ordinary farm tractor including a frame 4, front wheels 6, rear wheels 8, engine compartment 10, and an operator's seat 12 usually transversely aligned approximately over the rear wheels, where the operator sits to control the tractor by means including steering wheel 14, all as well understood in the art. These elements are shown and described only to give a general idea of the layout of the tractor.

The fertilizer tank contemplated by the present invention is indicated generally by the numeral 16, and is generally U-shaped in form, having a base portion 18 which is adapted to extend horizontally beneath frame 4, transversely thereto, and an upstanding leg portion 20 rising vertically from each end of said base portion, respectively at opposite sides of frame 2 and engine compartment 10. On the upper surface of base portion 18 of the tank, along the opposite parallel edges thereof extending longitudinally of the tractor, are affixed a pair of angle irons 22. Said angle irons extend along respectively opposite sides of tractor frame 4, and are adapted to be releasably secured to said frame as by screws 24, whereby to mount the tank firmly on the tractor. Vertical legs 20 of the tank preferably are terminated well below the top of engine compartment 10, whereby not to obstruct the forward vision of the operator to any appreciable extent. Each vertical leg 20 of the tank is provided, in the top wall thereof, with an air vent tube 26 having a vented hood 28, whereby to permit air to enter and leave the tank freely. One of the vent tubes may be formed sufficiently large, and its hood 28 made removable, to form a convenient opening for filling the tank with liquid fertilizer.

The bottom wall 30 of the tank is inclined downwardly from each side of the tank to its midline, as best shown in FIG. 3. At the bottom of the tank, in the rear wall 32 thereof, there is formed an outlet opening 34 which is connected by a conduit 36 to the intake side of a fluid pump 38 driven by an electric motor 40 or other suitable power means. A generally rectangular baffle plate 42 is mounted within the tank with its rearward edge secured to back wall 32, above opening 34, its side edges secured to tank bottom 30, and its forward edge spaced above bottom 30 to provide a thin triangular opening 44 through which fertilizer must flow to reach the outlet. Opening 34 extends much higher above the tank bottom than opening 44, the latter thereby assuring that the tank will be almost completely drained before air is sucked into the outlet by pump 38. It has been found impractical to use a bottom outlet for the tank to insure complete drainage, since the external connections to such an outlet would then be disposed below the tank and would have only a small clearance from the ground, so that damage thereto from ground obstructions could easily occur.

The outlet or delivery side of pump 38 is connected by conduits 46 and 48 with a tube 50 extending horizontally into the tank through rear wall 32 thereof, just above outlet 34, said tube being provided at its inner end with a cap 50 having an orifice 52 formed therein for directing a jet of fertilizer into the smaller end of a conical tube 54 arranged coaxially with but spaced apart from the orifice. The space between the orifice and tube 54 is open to the tank. Thus a portion of the fertilizer removed from the tank by pump 38 is returned to the tank through orifice 52 in jet form, whereby to continuously agitate the fertilizer in the tank. As previously described this agitation is necessary with fertilizers containing solid matter partially suspended in liquid, in order to maintain the solid matter in suspension and prevent settling thereof. The efficiency of the jet in this respect is greatly multiplied by tube 54. The jet and tube constitute a venturi nozzle, and create a partial vacuum between the jet orifice and the tube which draws large quantities of fertilizer (several times the volume of the jet itself) into and through tube 54, insuring thorough agitation of the entire tank volume. The U-shape of the tank, with the extremely wide and open connection between the tank legs 20 provided by tank base 18, makes thorough agitation of the entire volume possible with a single centrally located venturi nozzle. It would not be possible if tank legs 20 were in fact separate tanks, or were connected only by restricted piping.

Conduit 46 is interconnected into a conduit 56, which it will be understood delivers fertilizer through a manually operable regulating valve 58 to the spray bar or other dispensing apparatus attached to or towed behind the tractor to apply said fertilizer to the ground. Said dispensing apparatus, however, is well known in the art and is not in itself pertinent to the present invention, and is therefore not shown. Conduit 46 is also interconnected with a conducit 60 which is interconnected into the top of tank 16 through a pressure relief valve 62 which is set to open only when the pressure ahead of said valve somewhat exceeds the normal operating delivery pressure of pump 38. While pump 38, motor 40 and valves 58 and 62 are shown diagrammatically only, it will be understood that the pump and motor may be mounted in any convenient location, either on the tank or on the tractor itself, as could valve 62, and that valve 58 would normally be positioned conveniently to the operator.

In operation, it will be understood that pump 38 is operable, at its normal operating delivery pressure, to deliver a sufficiently large quantity of fertilizer both to furnish the maximum amount required to supply the spray bar or other fertilizer applicator apparatus from conduit 56, as when valve 58 is wide open, and in addition an amount of fertilizer sufficient to actuate venturi nozzle 54 to agitate the entire contents of the tank to maintain any solid matter therein in suspension. Relief valve 62 remains closed at this time. However, if regulating valve 58 is throttled down or entirely closed to reduce or shut off the supply of fertilizer to the applicator apparatus, pressure in conduits 46 and 60 rises, whereupon relief valve 62 opens to return excess fertilizer to tank 16. However, venturi nozzle 54 remains in full operation at all times, so that valve 58 can be reopened at any time with no danger that the solid matter in the fertilizer will have settled.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. For use in connection with a farm tractor having a frame spaced above the ground and extending between front and rear ground-engaging wheels, a tank for primarily liquid fertilizer, said tank being U-shaped, including a base portion adapted to extend horizontally beneath said tractor frame transversely to its direction of travel, an upstanding leg portion raising from the respective ends of said base portion so as to be disposed at respectviely opposite sides of said tractor frame, means for attaching said tank to said frame, means including a pump operable to remove fertilizer from said tank and deliver it to an applicator apparatus, and means for agitating said fertilizer in said tank, said agitating means constituting a jet nozzle disposed within said tank and interconnected by a suitable conduit with the delivery side of said pump whereby a portion of the fertilizer removed from said tank through said nozzle, and a tapered tube mounted in said tank in axially aligned relation with, but spaced apart from, said jet nozzle, the smaller end of said tube being closest to said nozzle, whereby to create a venturi effect.

2. The structure as recited in claim 1 wherein the delivery side of said pump is connected into the upper portion of said tank, and with the addition of a pressure relief valve interposed between said pump and said tank, said relief valve being set to open at a pressure somewhat higher than the pump delivery pressure required to supply said jet nozzle and the maximum requirements of said applicator apparatus.

References Cited
UNITED STATES PATENTS

| 356,769 | 2/1887 | Jaisle | 239—156 |
| 1,089,552 | 3/1914 | Harris | 222—564 |
| 1,953,331 | 4/1934 | Armstrong | 239—153 XR |
| 1,987,649 | 1/1935 | Wertz | 222—178 XR |
| 2,988,286 | 6/1961 | Snyder et al. | 239—142 |
| 3,310,237 | 3/1967 | Welch | 239—142 |
| 3,320,895 | 5/1967 | Peterson et al. | 222—178 |

FOREIGN PATENTS 2,455  2/1903  Great Britain.

WALTER SOBIN, Primary Examiner

U.S. Cl. X.R.

222—318, 564; 239—142